United States Patent [19]
Talvard et al.

[11] Patent Number: 5,583,919
[45] Date of Patent: Dec. 10, 1996

[54] INDEPENDENT PORTABLE APPLIANCE CONSTITUTING A TELEPHONE DEALER AND DIRECTORY

[76] Inventors: Jean-Pierre Talvard, 40, avenue Paul Claudel, Saint Germain Les Corbeil, France, 91250; Henri Seydoux, 3, boulevard Voltaire, Paris, France, 75011

[21] Appl. No.: 326,790

[22] Filed: Oct. 20, 1994

[30] Foreign Application Priority Data

Oct. 21, 1993 [FR] France ................... 93 12583

[51] Int. Cl.⁶ .................. H04M 1/64; H04M 1/26
[52] U.S. Cl. ................ 379/67; 379/88; 379/89; 379/354; 379/355; 379/357
[58] Field of Search ................... 379/354, 355, 379/357, 444, 88, 67, 89, 99, 214, 216

[56] References Cited

U.S. PATENT DOCUMENTS

| | | | |
|---|---|---|---|
| 4,864,622 | 9/1989 | Iida et al. | 379/355 |
| 4,949,374 | 8/1990 | Ishii et al. | 379/354 |
| 5,222,121 | 6/1993 | Shimada | 379/355 |
| 5,357,566 | 10/1994 | Dowling, Jr. et al. | 379/355 |
| 5,371,779 | 12/1994 | Kobayashi | 379/355 |
| 5,390,236 | 2/1995 | Klausner et al. | 379/88 |
| 5,452,340 | 9/1995 | Engelbeck et al. | 379/355 |

FOREIGN PATENT DOCUMENTS

| | | | |
|---|---|---|---|
| 0225656 | 12/1984 | Japan | 379/355 |
| 0016157 | 1/1989 | Japan | 379/355 |

*Primary Examiner*—Jeffery Hofsass
*Assistant Examiner*—Parag Dharia
*Attorney, Agent, or Firm*—Bardehle, Pagenberg, Dost, Altenburg, Frohwitter, Geissler & Partners

[57] ABSTRACT

The appliance includes: a memory containing a series of telephone numbers; means for addressing said memory; dialing means suitable for transforming an address number into a sequence of multifrequency signals; and a first transducer suitable for transforming said sequence into acoustic signals, and capable of being coupled to the microphone of a telephone handset. According to the invention, the memory further contains, for each number, at least one associated voice signature; a second transducer is provided suitable for picking up a looked-for name as uttered by the user; voice recognition means are provided suitable for analyzing a picked-up name and for transforming it into an associated voice signature; and addressing means are provided comprising association means suitable for finding data in the memory that correspond to that provided by the voice recognition means and for addressing the corresponding position in the memory.

13 Claims, 5 Drawing Sheets

INDEPENDENT PORTABLE APPLIANCE CONSTITUTING A TELEPHONE DEALER AND DIRECTORY

The invention relates to an independent cordless appliance constituting a telephone dialer and directory.

BACKGROUND OF THE INVENTION

Known appliances of this type have the general appearance of an improved calculator, being provided with an alphanumeric keyboard, and a small loudspeaker enabling dual-tone multifrequency (DTMF) dialing signals to be emitted corresponding to the various digits of a telephone number.

Ergonomically, such appliances turn out to be rather unsatisfactory, insofar as enriching and updating the directory and searching for a telephone number are operations that are lengthy and tedious: a person's name or part of the name must be keyed in via the alphanumeric keyboard which has a very large number of keys occupying a very small space, and it is necessary to apply procedures that occasional users find relatively difficult to remember.

In addition, such appliances are practically impossible to use with one hand only even though the other hand is holding the telephone handset, etc. This difficult and fiddly handling and also the rather long time taken to find and dial a number explain why such appliances have been moderately successful only, and why users often revert after a while to a conventional paper address book.

OBJECTS AND SUMMARY OF THE INVENTION

One of the objects of the present invention is to provide an appliance of the above type that is ergonomically far superior, and that has the following properties in particular:

simplicity of use: it must be at least as simple to use as a paper address book, avoiding the multitude of keys and buttons to be found on known appliances; in this respect, it can be seen below that in normal operation the appliance of the invention requires only one button to be manipulated in order to find a number and then dial it, and that new numbers can be stored using a keypad that is numerical only, with a greatly reduced number of function keys, thereby making it possible in a given available surface area to increase the size of the keys and of the screen so as to make them more agreeable for use by the user;

universality: the appliance must accompany a user everywhere and must be usable with any kind of telephone: an office telephone, a pay phone, a radiotelephone, etc., being of size and weight that are very small, similar to those of a calculator, so that the appliance can be genuinely a "pocket" appliance;

reliability of operation: it is essential to avoid any risk of confusion between two different names, e.g. because they are similar. It can be seen below that the appliance of the invention provides excellent discrimination between names and, in addition, it always repeats the name it has found so that the user can verify it and thus avoid any ambiguity and wrong numbers;

speed: in order to enable the appliance to have a decisive edge over a paper address book, it must be possible to interrogate the appliance, find a name, and dial the corresponding telephone number in a very short period of time. It can be seen below that the appliance of the invention makes it possible to achieve the above operations in a period of about 2 seconds to 3 seconds, which bears no relationship to the performance available from known appliances or paper address books.

As can be seen below, the present invention makes it possible to reconcile these various requirements by using an original concept, namely that of voice recognition for searching through the telephone directory, the voice recognition facility advantageously being associated with voice synthesis functions for guiding the user while using the appliance.

Voice recognition is a technique that is known per se, however until now it has been limited to highly specific applications such as gunnery control, controlling appliances for the handicapped, etc. Nevertheless, it is a technique that is very well adapted to the particular application envisaged by the present invention insofar as the speaker is generally a single person (the owner of the appliance, who keeps it on the person and is usually the only user thereof), and insofar as the words spoken are isolated and they are spoken close to the microphone, thereby protecting them from room noise, thus making it possible, in practice, to achieve a recognition rate of about 90%, which is highly effective in the intended application.

More precisely, as mentioned above, the appliance of the invention is of the general type comprising: a data memory containing a series of telephone numbers; means for selectively addressing said memory; dialing means suitable for transforming the telephone number addressed in the memory into a corresponding sequence of multifrequency dial signals; and a first acoustic transducer suitable for transforming said sequence of multifrequency signals into acoustic signals, said transducer being suitable for being coupled to the microphone of a telephone handset.

According to the present invention, the memory also contains, for each telephone number: at least one associated item of voice signature data; a second acoustic transducer is provided that is suitable for picking up the looked-for name as uttered by the user of the appliance; voice recognition means are provided suitable for analyzing the name picked up by the second transducer and for transforming it into an associated voice acoustic signature; and addressing means including association means suitable for searching the memory for voice acoustic signature information corresponding to that provided by the voice recognition means, and in the event of a match, suitable for addressing the memory at the corresponding position.

Preferred subsidiary features include the following:

voice synthesis means are also provided suitable for replying by generating a stored name on the basis of a voice signature found in the memory by the association means so as to enable operation of the appliance to be checked by the user;

after memory addressing and optional generation of the corresponding name for checking by the user of the appliance, the dialing means are not activated until the user has activated a specific confirmation control, preferably a pushbutton placed on the appliance in a position enabling it to be actuated by a finger of the hand in which the appliance is held, in such a manner that while looking for a number and then dialing it, it is possible to use the appliance in one hand only without performing any action other than that of uttering the looked-for name and that of actuating the pushbutton; in particular, the pushbutton may be a two-position button, having a depressed position and a released position, in which depression of the pushbutton activates the voice recognition means and release thereof activates the dialing means, said depression and release being separated by at least one step of the user uttering the wanted name and of successful recognition thereof by the voice recognition means;

in which case, provision is advantageously made for the second acoustic transducer to be is activated only while the pushbutton is held depressed during the step of uttering the wanted name;

when the association means do not find any voice acoustic signature data corresponding to that provided by the voice recognition means, the voice synthesis means emit a predetermined error message;

in order to input numbers corresponding to names in the memory, a digital keypad is provided together with dialog keys and a specific control for passing to operating and storage mode (advantageously constituted by an opening of a flap that covers the numeric keypad and the dialog keys) which control is actuated by the user in the event of the association means failing to find any voice acoustic signature data in the memory that corresponds to that provided by the voice recognition means, or in the event of the name that is found not corresponding to the name wanted by the user;

in which case, provision is preferably made for the voice acoustic signature stored after activation of the specific control for passing to operating and memorization mode to be that which corresponds to the first name uttered by the user, said reference voice signature being temporarily stored in the event that the user utters several names in succession before actuating said control;

the apparatus further comprises means for memorizing a plurality of voice samples of a single name as acquired in succession by the voice recognition means for the purpose of comparing said stored samples with a newly-acquired sample and for deleting the samples that resemble the others least and/or that are the least used during successive comparisons; and the data memory contains, in addition to telephone numbers associated with names, numerical codes of the password type.

BRIEF DESCRIPTION OF THE DRAWINGS

Other characteristics and advantages of the invention appear on reading the following detailed description made with reference to the accompanying drawings.

MORE DETAILED DESCRIPTION

Figure 1:
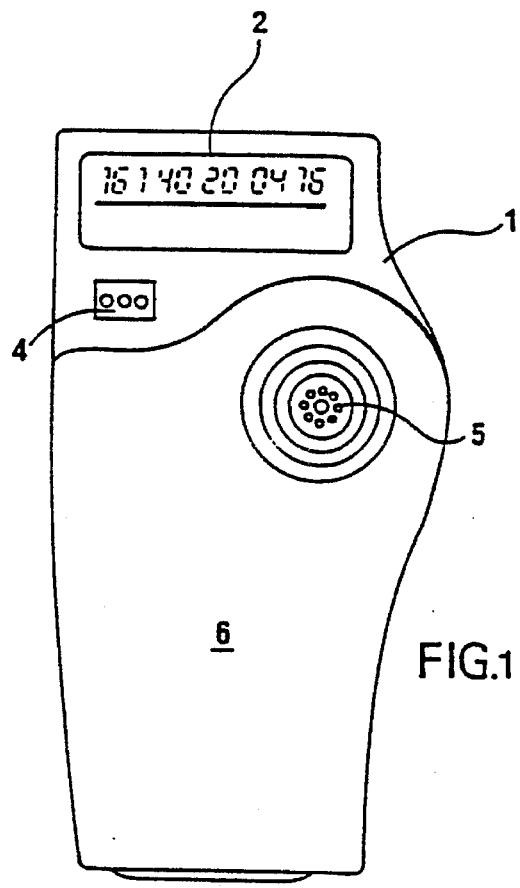
FIG. 1 is a front view of the appliance of the invention, with its cover closed, i.e. ready for normal use (finding and dialing a stored number).
Figure 3:
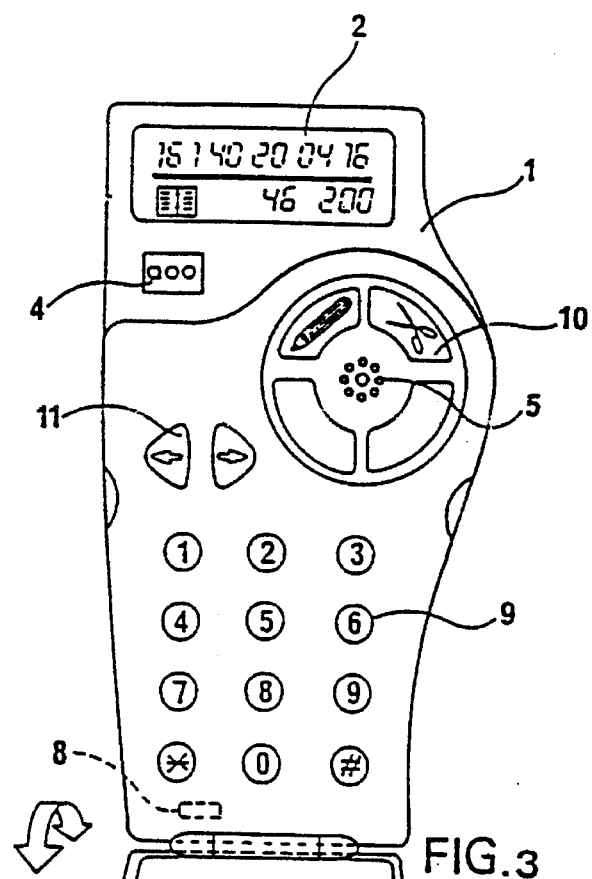
FIG. 3 is similar to FIG. 1, but with the cover open, corresponding to a storage mode.
Figure 2:
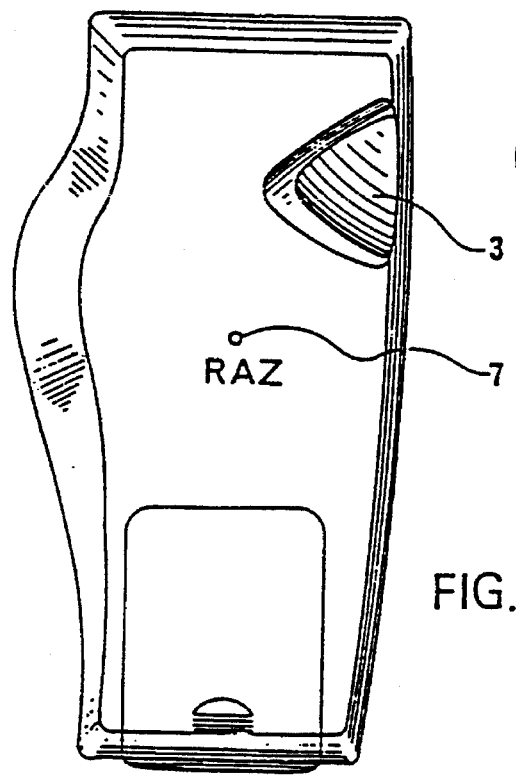
FIG. 2 is a back view of the same appliance.

The appliance shown in FIGS. 1 to 3 essentially comprises a box 1 having a screen 2 (which in the version illustrated is a two-line display shown displaying sixteen characters and an icon), a pushbutton 3 situated on the back face (referred to below simply as the "button" of the appliance), a microphone 4, and a loudspeaker 5. These elements are the only elements that can be seen when the appliance is in its position for normal use, i.e. with a cover 6 that is closed, as shown in FIGS. 1 and 2.

It will be observed from the drawings that the box 1 has a specially adapted shape making it easy to hold in the hand, the box being held in the palm of the right hand so that the end of the index finger is positioned to press the button 3, thereby making the appliance natural and instinctive to use with one hand only, with the action being reminiscent of clicking on the button of a computer "mouse". The appliance can also be held in the left hand, with the button 3 being actuated by the thumb.

Reference 7 designates a microswitch that can be actuated by a pin in order to physically reset the processor. Even though all data is lost, resetting may be required in the event of an exceptional failure (interference, loss of secret code, batteries exhausted, etc.). Provision may also be made for restarting the appliance without losing data, e.g. by pressing simultaneously on two keys.

When in the open position (FIG. 3) the cover flap 6 which is mounted on a hinge reveals a digital keypad (the twelve keys of a standard telephone keypad) together with a small number of function keys, e.g. (keys 10) two reply keys "YES" and "NO" (to reply to questions put by the appliance, whether displayed on the screen 2 or spoken through the loudspeaker 5), a remove key symbolized by a pair of scissors, a modify key symbolized by an eraser-tipped pencil, and two displacement keys (keys 11) symbolized by a left arrow and a right arrow. The precise way in which these keys are used is described below, it being understood that they are used solely in modes for storing, correcting, removing, and scanning through the directory.

Opening of the cover 6 is detected by an internal switch 8, e.g. a switch having a flexible blade activated by a small magnet molded into the cover.

Naturally, various functions such as displaying time and date, rendezvous alarms, calculator functions, etc. can be integrated in the appliance. Such functions are known per se and do not affect the operation of the appliance as an address book and telephone dialer; they are therefore not described in greater detail.

Figure 4:
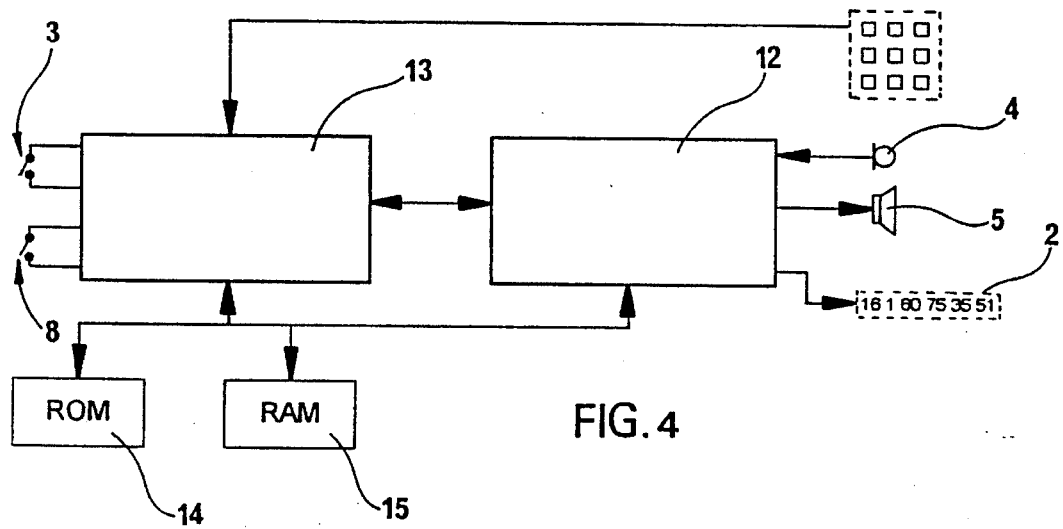
FIG. 4 is a block diagram of the various elements making up the circuits in the appliance of the invention.
Figure 5:
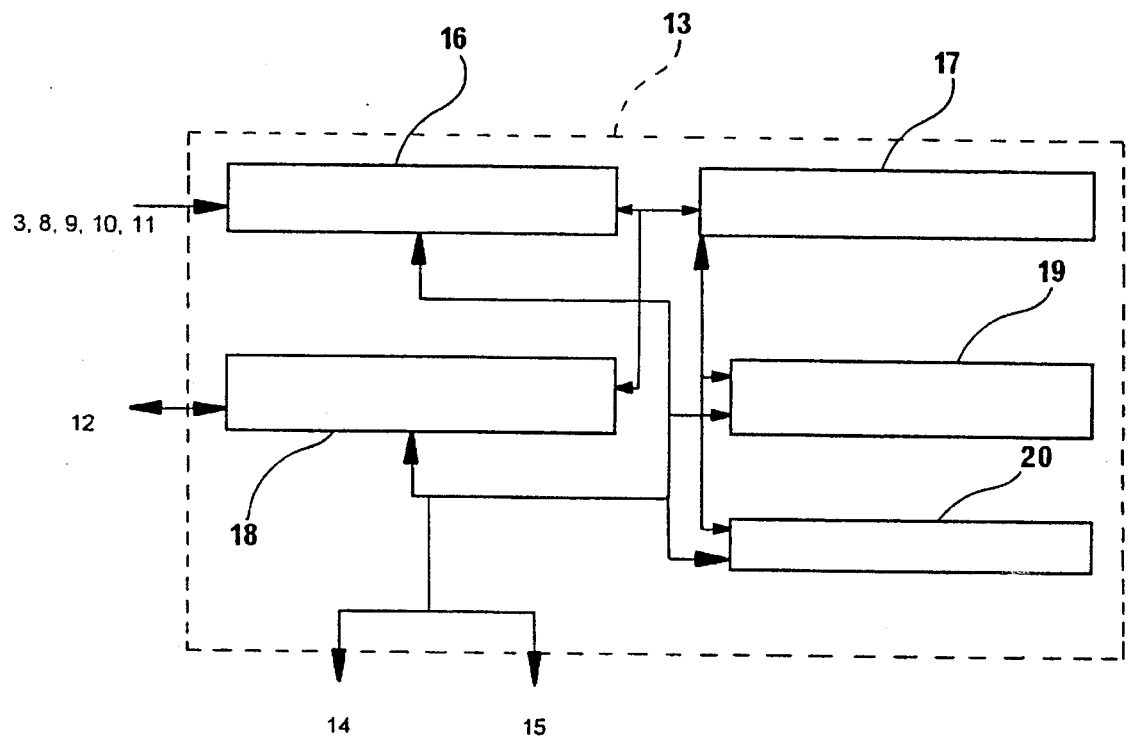
FIG. 5 is a block diagram showing details of the various functional elements in the digital circuit of the diagram of FIG. 4.

FIGS. 4 and 5 are block diagrams showing the various internal elements of the appliance.

As can be seen in FIG. 4, it is essentially organized about four functional blocks corresponding to four distinct components, namely: an analog circuit 12, a digital circuit 13, a read-only memory (ROM) 14, and a read-write memory (RAM) 15. The analog circuit 12 is an application specific integrated circuit (ASIC) designed to handle input and output in conventional manner, namely: as inputs, signals from the microphone 4 which are sampled and digitized by the analog circuit for transmission to the digital circuit 13; and as output, driving the loudspeaker 15 on the basis of digital samples delivered by the digital circuit 13, and also controlling the various pixels on the screen 2.

As shown in FIG. 5, the digital circuit 13 has an interface unit 16 for external connection, that receives the various signals from the keys 9, 10, and 11 of the keypad and from the contacts 3 and 8, a clock and interrupt handler unit 17, and a combined arithmetic and logic unit and signal processing unit 18 (ALU/CPU) that co-operates in particular with the analog circuit 12, a voice recognition unit 19, and an address management unit 20. These various blocks are connected to one another and to the external memories 14 and 15.

Voice synthesis is provided by the digital circuit using known techniques for compacting voice signals such as adaptive differential pulse code modulation (ADPCM) in which encoding is performed by slope prediction, or linear predictive coding (LPC) in which coding is performed by factorizing adjacent standing waves. While voice signals are being stored, coding may be performed in deferred time, and while they are being played back decoding may be performed in real time by reading slope prediction tables in the first case or by a recursive filter in the second case.

The digital circuit 13 may, in particular, be implemented in the form of a digital signal processor (DSP) or of any other microprocessor that is fast enough to execute (known) algorithms for voice recognition, voice coding, and voice synthesis, and also (conventional) algorithms for controlling mass memory, performing real time control, and for running an applications program.

A particular variant implementation of the voice recognition means is described at the end of the description in which software and hardware are combined in such a manner as to obtain improved performance (essentially for look-up time and recognition time) while simplifying practical implementation.

The applications software is organized in modular manner on the basis of a set of automatons each corresponding to a particular portion of the application: taking the application in hand (learning sequence during first use); recognition and dialing (operating with the cover closed); operating the directory; storing a new name; inputting a telephone number; and error handling.

Other automatons may also be included for subsidiary features: interactive help; international dialing (see below); transferring data to another appliance of the same type or to a computer; etc.

All these automatons operate using the same syntax, namely they receive two parameters (a command and an optional parameter) and they return a Boolean value depending on whether they are remaining in control or whether they are passing control on (respectively "TRUE" and "FALSE").

The commands are of four types:

commands internal to the automaton: starting, requesting a stop, suspension, and restarting;

keypad commands: a command for each key of the numerical keypad 9 and of the function keypad 10 and 11, and one for the button 3;

commands for speech recognition and synthesis: words pronounced but not recognized, errors (words too loud, too long, or not speech), end of synthesis, end of dialing; and hardware events: opening/closing the keypad, system inactive for several seconds (e.g. for more than 5 seconds), battery low.

Depending on the commands received and on their internal states, the automatons choose to execute a service procedure (see below) as a function of said parameters, and after the procedure has been executed, they change state or they return control to the automaton that gave them control (which automaton was waiting for control to be returned to it).

There are five types of service procedure called by the automatons:

database management;

data chaining;

managing speech recognition/synthesis;

memory management; and statistics.

These various procedures are programmed so as to execute the various operations that are described in detail below in the present description (see below, utilization sequences). Since the various procedures can be written by the person skilled in this art on the basis of the description of the sequences, the program contents of the various procedures is not given in detail, nor is the program contents of the automatons that call them.

The service procedures, considered in isolation, are themselves conventional in the functions they perform.

For voice recognition, the microprocessor reads data coming from an analog-to-digital converter having a resolution of twelve, fourteen, or sixteen bits, and at a rate of ten thousand times per second. The data may be filtered to enhance high frequencies, and then weighted with the preceding sample (Hamming window). Thereafter, forty times per second, the processor performs a fast Fourier transform (FFT) using an optimized algorithm such as those of Good or of Cooley-Turkey. The Fourier transform gives the quantity of energy in the signal during the sampling period in sixteen different frequency bands (for example) that are distributed in conventional manner between 200 Hz and 4200 Hz. This result is called the "search vector" for 1/40th of a second of speech. After this stage of signal analysis, the processor then performs the recognition stage proper: given that the vectors of each known word are stored in memory, the processor compares the vector it receives every 1/40th of a second with the vectors of the words in memory by using a dynamic programming matrix. The comparison is performed by calculating the differences of arithmetic distances. When running through the vectors, once six vectors of silence (a pre-defined) have been detected in succession (end of word), it is known which word-forming set of vectors has the smallest sum of arithmetic distances between its stored vectors and the vectors that have been analyzed.

As for the other service procedures, it is merely mentioned that in addition to the usual functions, it is possible to provide for the database to be consolidated, thereby enabling recognition of words to be improved over successive pronunciations thereof.

To this end, when there is enough memory space when there remains room for at least ten samples), then when the appliance learns a new name, it memorizes the first five samples of the name on the first five recognitions thereof. During the next five recognitions, it identifies those of the samples that had the best and the worst recognition scores. On the fifth recognition, the three samples with the worst scores are eliminated and during the next three recognitions the appliance stores the new samples. The sequence then starts over during the next five recognitions in the manner described above, and so on. When memory space becomes short, and it is no longer possible to perform the above algorithm, a general pass is made over the set of samples and the least-used reference of each of the words is deleted. If the memory space available is still insufficient, then one sample is deleted, and then another, and so on until there is enough memory or until only one sample is retained per name, thereby optimizing memory usage.

It may be observed that these consolidation algorithms enable the user to adapt progressively to the machine, since to begin with the number of samples stored for each word is at a maximum, and this is particularly advantageous until the user has acquired the habit of uttering names uniformly.

The operation of the set of procedures and automatons is coordinated by a supervision loop (corresponding to function block 17) which generates a real time interrupt once every 25 ms as a background task. In this background task, a routine executes three subprograms:

a first program scans the various sensors (keypad, function keys, button, cover opening, microphone signal, battery low) and, if a change of state is detected, the background task places a corresponding event in a ring buffer (event buffer);

a second program scans the state of the subprograms for supervising acquisition, analysis, scanning through the dynamic programming matrix, synthesis, and DTMF dialing, and passes control to them where appropriate; these subprograms subsequently place a corresponding event in the event buffer to be taken into account by the application; and a third program scans the speech synthesis buffers and if processing has been completed, it places a corresponding event in the event buffer.

The main supervision loop revolves around reading the event buffer, and if it finds an event to be processed, the event is transferred to the active automaton; otherwise the apparatus is put into an idle mode until the next real time interrupt, so as to optimize battery usage.

The description given below with particular reference to FIGS. 6 to 13 relates to the various possible sequences with which the appliance of the invention can be used, and to how they are implemented by the software configuration described above (automatons, service procedures, supervision routine, etc.).

1) Normal use sequence for a name known to the appliance (operation with the cover closed) (FIGS. 6 to 9)

Figure 6:
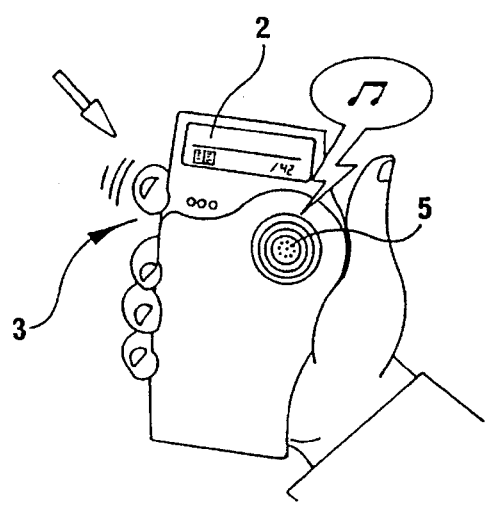
FIGS. 6 to 9 show different steps in using the appliance to find and then dial a number.

The user takes hold of the appliance and presses the button 3. The appliance then emits an audible "beep" and displays on its first line the message "SPEAK" and on its second line the message "/42" indicating the number of names stored in its directory memory (FIG. 6).

Figure 7:
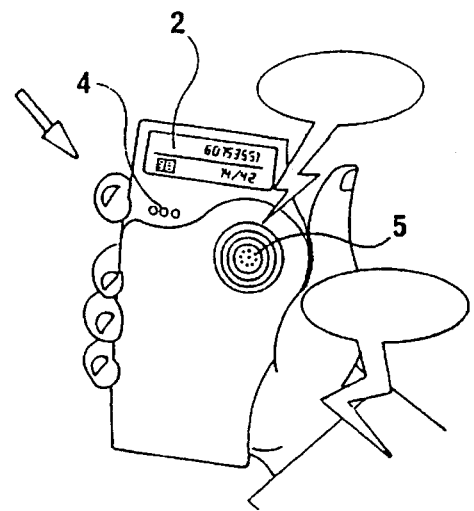

The user then brings the microphone close to the mouth and speaks the name that is to be looked-up ("SO-AND-SO"). If the name is known to the appliance and if it has been uttered correctly, then the appliance responds by voice synthesis and via its loudspeaker to echo the name it has found in its directory ("SO-AND-SO") and it displays the corresponding telephone number on its first line while displaying a message such as "14/42" on its second line indicating that this is the fourteenth name in its directory, which directory has a total of forty-two names (FIG. 7).

Figure 8:
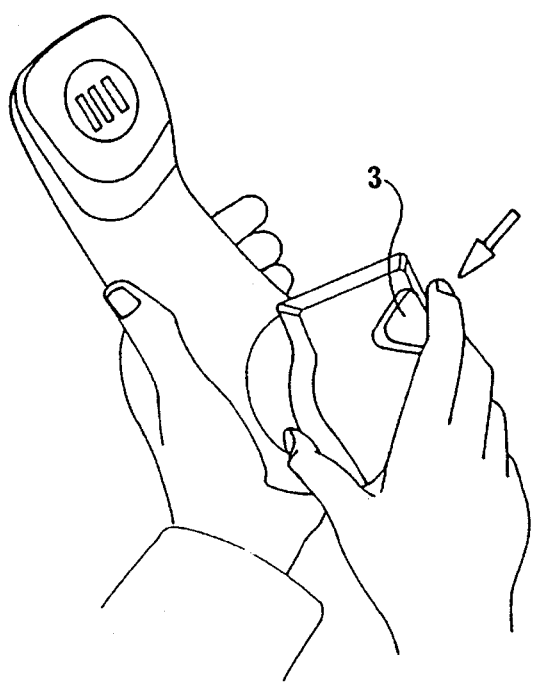

Assuming that the name echoed by the appliance is indeed the same as the name uttered, and corresponds to the person the user wants to call, the user moves the loudspeaker of the appliance over the microphone of the telephone handset while keeping the button 3 pressed down (FIG. 8).

Figure 9:
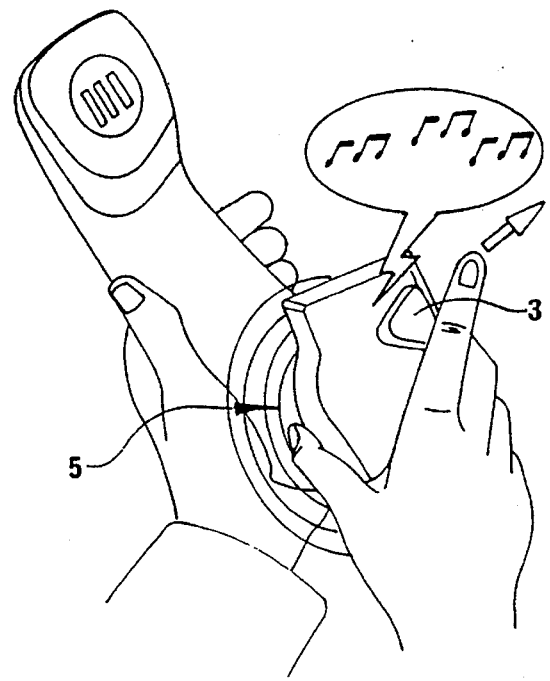

The user then releases the button which has the effect of causing voice frequency tones to be emitted that enable the desired number to be called (FIG. 9).

For better comfort in use, there is no need for the user to keep the button pressed down continuously; the user may click the button (press it down and release it in quick succession) . . . speak . . . and then click again to dial. In other words, it is not the position of the button (depressed or not) that is detected but only a transition from one position to another. This also makes it possible to dial again by clicking once more, e.g. if the appliance was not brought close enough to the handset the first time.

Nevertheless, the possibility of keeping the button permanently depressed can be advantageous in noisy environments, with the microphone of the appliance being activated only while the button is held down while the wanted name is being uttered.

Naturally, the user also has the option of dialing the number directly on the keypad of the telephone set, while reading the number from the display of the appliance. This option has the particular advantage of being usable with older telephone exchanges that require pulse dialing.

In addition, the number shown on the display need not be a telephone number: for example it might be a secret code associated with a bank card, a code for opening a door, a "numeric" password for an on-line server, etc., with the user storing the code in the appliance by dialing the number using the appliance's keypad and associating the number with some made-up name that is much easier to remember than a numerical code.

2) Normal use sequence, when the appliance proposes a wrong name (FIGS. 6 to 10)

The operating sequence is the same as above, except that the name given in response by the appliance is not the name that the user wants: in other words the appliance has recognized a name, but not the right name (the name may have been poorly uttered by the user, or it may be absent from the directory, but resemble a name that is already known).

Under such circumstances, the user can make one or more further attempts, e.g. while improving the clarity of the utterance. Name analysis is performed again, and the appliance may either suggest another name (which may be the wanted name, in which case the procedure continues as described above), or else it may continue to propose the same, wrong name.

Figure 10:
FIGS. 10 to 13 show various steps when using the appliance in storage mode.

Under such circumstances, the user may then open the cover to teach a new name to the appliance, in the manner described below. If the user decides not to continue, then the operation may be abandoned, e.g. by releasing the button 3 if it was being held down, thereby causing the appliance to emit dial signals into the air (FIG. 10). If the cover is opened before the button is released, then no dialing signals are emitted.

Here again, to improve user comfort, there is no need for the user to keep the button continuously depressed; the user may click the button . . . say a name . . . say it again if so desired . . . . This avoids emitting dialing signals that are not for use.

3) Normal use sequence when the name is not known to the appliance (FIGS. 6 to 10)

In this case, on finding no similar name in its directory, the appliance emits a message "I don't know SO-AND-SO" and displays "UNKNOWN" on the first line of the screen. Here again, the user can open the cover and teach the new name to the appliance.

Figure 11:
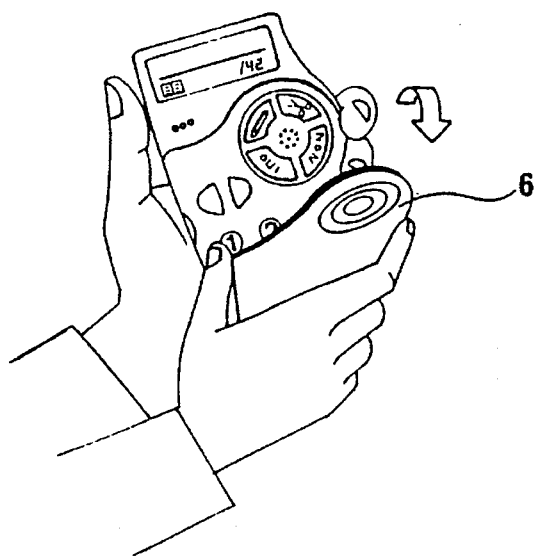
Figure 12:
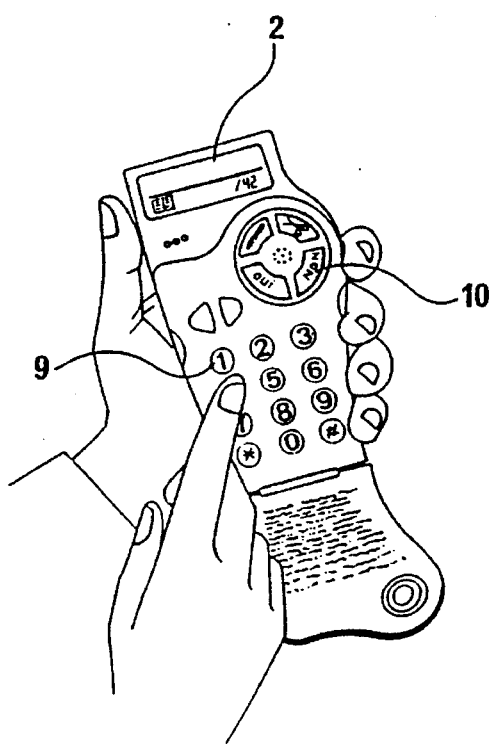
Figure 13:
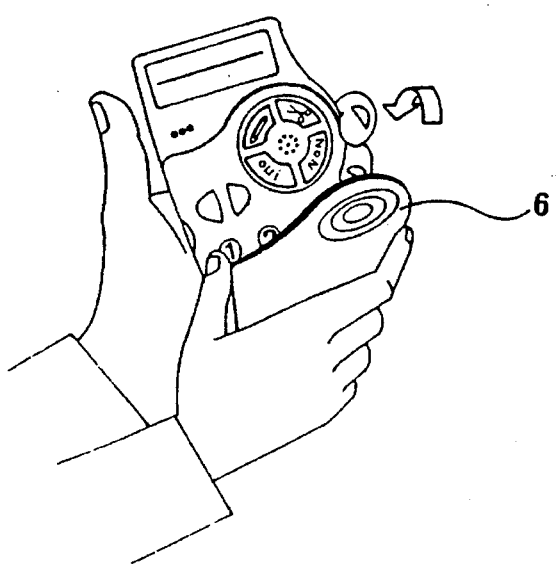

4) Sequence for memorizing an unknown name (FIGS. 11 to 13)

The user opens the cover 6 (FIG. 11), thereby operating the sensor 8 which informs the circuits of the appliance that the user seeks to interrupt any sequence that may be presently in progress and move on to a storage sequence.

The appliance then speaks the message "Should I learn the name SO-AND-SO?" and on the screen it displays "LEARN?" on the first line and "/42" on the second line. The name repeated by the appliance is preferably the same as the name originally given by the user, which name has continued to be stored in its memory, even if other attempts have been made subsequently.

Using the function keys 5, the user replies "YES" (or has a change of mind and presses the key "NO").

The appliance then speaks the message "Key in telephone number" and displays the same message on the screen.

The user then keys in the corresponding telephone number using the digital keypad 9 (FIG. 12).

The appliance then confirms that the procedure has been performed properly by speaking the message "The name SO-AND-SO has been learnt" and by displaying the keyed-in number on the first line while also displaying "12/43" on the second line thus indicating that the new name has been inserted in the twelfth position in the directory, which now has forty-three entries.

The concept of "position" in the directory relies on it being possible to sort directory entries, e.g. as a function of the number of digits in a number (eight-digit numbers being stored before nine-digit numbers, etc.), and then in numerical order, thus making it possible to distinguish geographical areas which can be convenient when scanning through the directory.

The user then closes the cover 6 (FIG. 13) and can go back to sequence No. 1) in order to cause the newly-earned number to be dialed, if so desired. Otherwise, the appliance switches off automatically after some predetermined time lapse, e.g. 5 seconds.

5) Sequence for consulting the directory

This sequence is brought into operation automatically when: (i) the appliance is switched off when its cover is opened, or (ii) a full number has been dialed, or (iii) the cover is reopened after being closed and without any new search being performed while it was closed.

The directory is then set to the most recently dialed number (cases (i) or (ii) above) or to the most recently consulted number (case (iii)). For example, the screen may then display "12/45" on its second line.

The user can then scan through the directory using the right and left arrow keys 11. Each time a key is pressed, the message on the second line of the screen changes (e.g. "13/45" after one press on the forward arrow key) and the corresponding name (or a portion thereof) is spoken by the loudspeaker of the appliance while the number is displayed on the first line of the screen.

6) Sequence for deleting names from the directory

After scanning through the directory in the manner explained above, or after finding a given name by uttering it to the microphone 5, the user presses the "pair of scissors" function key. The appliance responds by asking "Should I delete the name SO-AND-SO?", and the user replies "YES" or "NO" by applying on the corresponding function key. In the affirmative, the appliance speaks a confirmation message "The name SO-AND-SO has been deleted".

7) Sequence for changing a telephone number

This sequence takes place in a manner similar to the delete sequence, except that the user presses on the "pencil-and-eraser" function key and then enters the new telephone number using the keypad 9. The various steps include appropriate successive messages such as "Do you want to change the telephone number of SO-AND-SO?" . . . "Key in the new telephone number, then press YES to finish".

8) Sequence for starting up, setting parameters, and learning

Various other sequences may be provided, for example a sequence for starting up and for learning, to guide the user initially by means of successive messages asking the user to specify the language in which messages should be spoken by the appliance, to specify his/her own name and telephone number, to specify whether a first directory entry is to be learnt, etc.

Thus, the first time the appliance is switched on by the user pressing the button, the appliance says the following "Hello, please open me—Bonjour, ouvrez-moi s'il vous plait—Buenos dias, abrir me pot favor". After the user has opened the cover, the appliance says the following "If you speak English, press one—Si vous parlez français tapez sur deux—Se habla usted español, toque tres".

After the user has selected a language by pressing the corresponding key, the dialog continues as follows: "Do you want to learn how to use me? Press YES or NO" . . . "What is your name" . . . "Should I store SO-AND-SO?" . . . "Key in the telephone number and press YES to finish" . . . "SO-AND-SO has been learnt. Close the cover" . . . "Say SO-AND-SO" . . . "Repeat SO-AND-SO and press the button on the side".

9) National and international dialing

During this stage of first use, the owner of the appliance can be asked to give not only his/her own number, but the telephone code for the corresponding country, the code used in that country for making international calls, the area code of the user's own number, and the code for making long distance calls.

For example, the dialog may be based on the following messages: "Key in the country code for your country, e.g. 44 for the UK" . . . "Key in the area code for your area, e.g. 171 for Central London" . . . "Key in your international access code, e.g. 00 in the UK" . . . "Key in your long distance access code, e.g. 0 in the UK" . . . "Do you need to dial a code for an outside line, e.g. 0?" . . . "I have learnt your telephone number. If you want to telephone from another location press 2, otherwise press 1".

At this stage the appliance knows how to dial from home.

The user should always enter telephone numbers as though they were being dialed from home (i.e. including or omitting any long distance or area or international or country codes, etc.).

If the user presses "2", then the same questions as above are repeated but as applicable to some temporary location (replacing "your . . . " by " . . . from where you are now").

On the basis of the above information, the dialing automaton is capable of recognizing automatically from the way in which the numbers are recorded (they continue to be recorded as though the user were calling from home regardless of the location in which the user is presently located)

whether or not it is necessary to dial an international code, a country code, an area code, etc.

Various improvements can be included in the appliance of the invention, and also to the way in which it is used.

In particular, because it has acoustic transducers (microphone and loudspeaker), it is possible to provide very simply for the appliance to transmit data to another appliance or for it to transmit data to a computer fitted with acoustic transducers and emulating the operation of such an appliance. Such transmission can be provided between two remote appliances (or between an appliance and a remote computer) by means of a telephone line, or between two appliances that are physically close together, by applying the microphone of one of the appliances against the loudspeaker of the other, and vice versa.

In order to enable such data transmission to take place, essentially for the purpose of downloading the contents of the directory or a portion thereof (e.g. to update a data memory) in one direction or the other, use is made of the transducers of the appliance and of the associated circuits like an acoustically coupled modem. In particular, the data may be frequency and/or amplitude and/or phase multiplexed, with data packets being coded and decoded and multiplexed and demultiplexed by means of a processor included in the appliance, which processor may also be used for performing voice recognition.

Such transmission is performed using a protocol that is itself conventional, e.g. one that may be organized in the following five levels:

level 1: bit coding;

level 2: packet coding;

level 3: packet interchange protocol;

level 4: transmission session protocol;

level 5 (application level): protocol for verifying data conformity as a function of the intended application.

The first four levels make use of conventional techniques that form part of the knowledge of the person skilled in the art and they are therefore not described in detail.

The fifth level is specific to the application, and provision may be made, in particular, to begin transmission by a special packet that specifies the nature of the data being interchanged, a version number of the software in the emitting appliance (to enable a subsequent test of compatibility between different versions), the amount of memory required for the data that the appliance is about to transmit (in order to make sure that the receiver has sufficient memory, particularly if it is constituted by an earlier version having facilities that are less extensive), etc.

The data is transmitted and analyzed by the receiving appliance (or the receiving computer) which may then make such decisions as may be required: it may request user confirmation if the data to be transmitted exceeds available memory space, it may cause a warning message to be returned to the transmitting appliance if the version number of the data to be transmitted does not correspond to the version number of the software in the receiving appliance or computer, etc.

Another improvement relates to the way in which vector comparisons are performed in the speech recognition functions.

The particular implementation of the improvement consists in performing the calculations concerning distance and path through the dynamic programming matrix by a combination of software and of hardware. Specialized hardware computes vector distances for a sequence of vectors that are stored in continuous manner in the memory, e.g. eight or sixteen consecutive vectors of the same word in the directory. Once the computation has been performed, the specific hardware generates an interrupt or some other hardware means to inform the processor that the task has ended.

The interrupt processing procedure then reloads the read and write address registers of the specific hardware so as to cause computation to be restarted, and then it uses software to perform the conventional operations of speech recognition using the dynamic programing algorithm, namely:

adding the computed vector distances to the preceding distance sums so as to determine the best path through the matrix, e.g. local equating by Itakura (1975) or by Sakoe and Chiba (1978);

applying global constraints so as to reject searches that are remote from predefined zones of the center of the matrix so as to accelerate rejection of words that are not meaningful; and normalizing the scores given as a function of the size of the matrix so that results remain comparable even when using matrices of different sizes.

Figure 14:
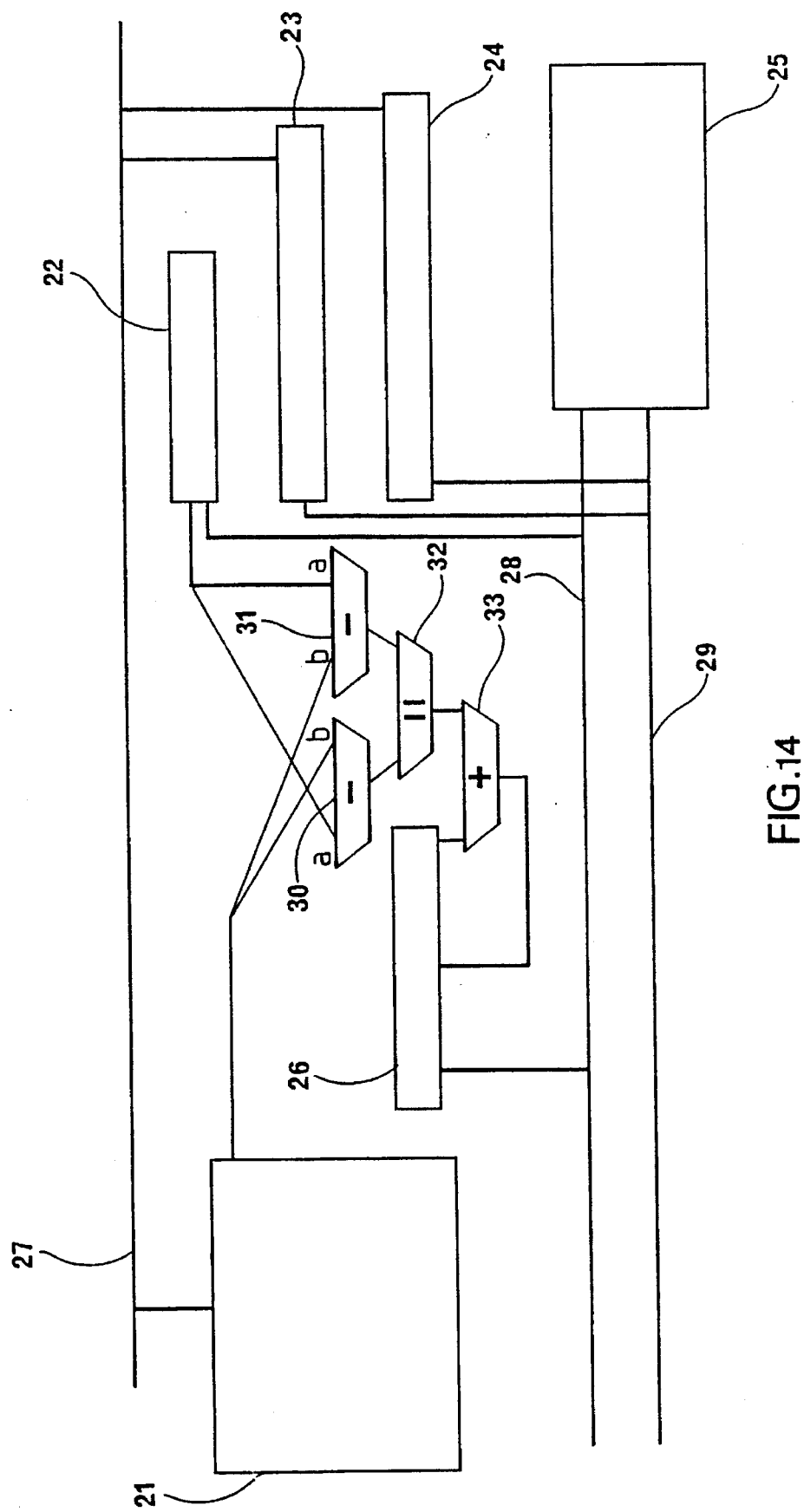
FIG. 14 is a block diagram showing a particular variant embodiment of the voice recognition means combining software and hardware so as to increase performance while simplifying practical implementation.

FIG. 14 is a diagram showing the specific hardware that enables the above functions to be implemented.

In this figure, reference 21 designates a battery of sixteen eight-bit registers that are loaded by the processor with each search vector (forty times per second); these registers contain the "spoken" vector that is to be compared with a sequence of eight vectors in each of the vocabulary words, which sequences are loaded in an input register given reference 22.

For each word to be compared (i.e. forty times per second multiplied by the number of words in memory), a read address register 23 and a write address register 24 are loaded and the specific hardware is caused to operate in the manner described above. The read address register 23 points to eight consecutive word vectors in memory at the location where searching is taking place (this address is determined by software), while the write address register 23 points to a memory buffer having eight sixteen-bit words where computation results are stored, i.e. the eight approximations of the vector distances computed by the hardware.

The function block 25 is a module that is conventional per se for arbitrating memory access between the processor and the specific hardware of the invention, serving to resolve the conflicts that are due to concurrent accesses being made to the main memory. An accumulator 26 is also provided.

The line referenced 27 designates the local data bus of the processor which may also be the general memory bus. Lines 28 and 29 respectively designate the data bus and the address bus for memory access.

The circuits 30 to 33 are respectively two subtracters, an absolute value tester, and an adder.

The circuit operates as follows.

Firstly, using software, the conditions for computing the eight consecutive vector distances in memory are initialized as follows:

loading the battery of registers 21 that contain the vector under analysis that is to be compared;

writing in register 23 the memory address of the eight consecutive vectors to be compared; and writing in register 24 the memory address of the eight forthcoming consecutive results.

Thereafter, the specific hardware executes the following steps:

(a) two counters (not shown) are zeroed;

(b) the accumulator 26 is zeroed;

(c) the eight-bit word whose address is to be found in register 23 is read and its contents is placed in register 22;

(d) the read register 23 is incremented (thus making it possible, from this instant, to re-read in parallel the following value into the input register 22, thereby saving time);

(e) the value in the input register 22 is transferred into the two subtracters 30 and 31;

(f) the following value of the input vector 21 containing the vector under analysis is placed in the two subtracters;

(g) the first subtracter performs the operation (a-b) while the second performs the operation (b-a);

(h) the comparator 32 calculates the absolute value: if the quantity (a-b) has a positive sign bit, it is transferred to the adder 33, otherwise (b-a) is transferred thereto;

(i) the adder 33 adds the value found to the contents of the accumulator 26;

(j) a counter (not shown) that serves to count down from 15 to 0 is decremented, and if its value is not zero, then the procedure returns to above step (c);

(k) the value in the accumulator 26 is written to the address contained in the write register 24;

(l) the write register 24 is incremented;

(m) a counter (not shown) that counts down from 7 to 0 is decremented, and if its value is not zero, then the procedure begins again from above step (b); and (n) finally an interrupt is generated to indicate that vector comparison has terminated.

This method of proceeding makes it possible to perform vector comparisons quickly by combination of hardware and of software; it is much simpler and provides much greater performance than methods that are based on software only or on methods that make use of a complete coprocessor.

What is claimed is:

1. An independent portable appliance comprising a telephone dialer and directory comprising:

a data memory containing a series of telephone numbers and for each telephone number at least one associated item of voice signature data;

means for selectively addressing said memory;

dialing means suitable for transforming the telephone number addressed in the memory into a corresponding sequence of multi-frequency dial signals;

a first acoustic transducer suitable for transforming said sequence of multi-frequency signals into acoustic signals, said transducer suitable for being coupled to a microphone of a telephone headset;

a second acoustic transducer suitable for picking up a looked-for name as uttered by a user of the appliance;

voice recognition means suitable for analyzing the name picked up by the second transducer and for transforming it into a voice acoustic signature; and addressing means, including association means, suitable for searching the memory for voice acoustic signature information corresponding to that provided by the voice recognition means, and in the event of a match, suitable for addressing the memory at the corresponding position;

voice synthesis means for replying by generating a stored name on the basis of a voice signature found in the memory by the association means so as to enable the user to check the operation of the appliance;

a digital keypad with dialog keys and a specific control for passing to operating and storage mode, said control being actuated by the user in the event of the association means failing to find any voice acoustic signature data in the memory that corresponds to that provided by the voice recognition means, or in the event the name that is found does not correspond to the name desired by the user such that after activation of the specific control or passing to operation and memorization mode, the voice acoustic signature stored is that which corresponds to a first name uttered by the user, said name being temporarily stored in the event the user utters several names in the succession before actuating the control.

2. An appliance according to claim 1, further comprising voice synthesis means for generating a stored name on the basis of an item of voice signature data found in said data memory by the association means for verification of the name by the user.

3. An appliance according to claim 2, wherein the voice synthesis means emits a predetermined error message when the association means does not find a voice acoustic signature data corresponding to data provided by the voice recognition means.

4. An appliance according to claim 1, wherein said dialing means is not activated until the user has activated a specific confirmation control.

5. An appliance according to claim 4, wherein said specific confirmation control comprises a push-button placed on the appliance in a position enabling it to be actuated by a finger of the hand in which the appliance is held such that the appliance may be used in one hand only without performing any action other than that of uttering the looked-for name and that of actuating the push-button.

6. An appliance according to claim 1, further comprising a push-button wherein a first action of said push-button activates the voice recognition means for successful recognition of a looked-for name and a second action of said push-button activates the dialing means.

7. An appliance according to claim 6, wherein said second acoustic transducer is activated only during said first action.

8. An independent portable appliance comprising a telephone dialer and directory comprising:

a data memory containing a series of telephone numbers and for each telephone number at least one associated item of voice signature data;

means for selectively addressing said memory;

dialing means suitable for transforming the telephone number addressed in the memory into a corresponding sequence of multi-frequency dial signals;

a first acoustic transducer suitable for transforming said sequence of multi-frequency signals into acoustic signals, said transducer suitable for being coupled to a microphone of a telephone headset;

a second acoustic transducer suitable for picking up a looked-for name as uttered by a user of the appliance;

voice recognition means suitable for analyzing the name picked up by the second transducer and for transforming it into a voice acoustic signature; and addressing means, including association means, suitable for searching the memory for voice acoustic signature information corresponding to that provided by the voice recognition means, and in the event of a match, suitable for addressing the memory at the corresponding position;

wherein the dialing means is not activated until the user has activated a specific confirmation control comprising a push-button placed on the appliance in a position enabling it to be actuated by a finger of the hand in which the appliance is held such that the appliance may be used in one hand only without performing any action other than that of uttering the looked-for name and that of actuating the push-button, wherein a first click of the push-button activates the voice recognition means and a double click of the push-button activates the dialing means such that after said first click of the push-button when the user utters the looked-for name, successful recognition thereof occurs by the voice recognition means.

9. An appliance according to claim 8, further comprising a digital key pad comprising dialog keys and a specific control for passing to operating and storage modes, wherein said specific control is actuated by the user in the event the association means fails to find any voice acoustic signature data in the memory that corresponds to the voice acoustic signature provided by the voice recognition means, or in the event the name found does not correspond to the name wanted by the user.

10. An appliance according to claim 9, wherein said specific control for switching to the operating and storage modes comprises a contact responsive to opening of a flap that covers the digital keypad and the dialog keys.

11. An appliance according to claim 9, wherein a voice acoustic signature stored after activation of the specific control for passing to operation and storage modes corresponds to a first name uttered by the user, said name being temporarily stored in the event that the user utters several names in succession before actuating said control.

12. An appliance according to claim 8, further comprising means for memorizing a plurality of voice samples of a single name as acquired in succession by the voice recognition means for comparing stored samples with a newly-acquired sample and a means for deleting samples that least resemble other samples and/or that are the least used during successive comparisons.

13. An appliance according to claim 8, in which the data memory contains, numerical codes.

* * * * *

UNITED STATES PATENT AND TRADEMARK OFFICE
CERTIFICATE OF CORRECTION

PATENT NO. : 5,583,919
DATED : December 10, 1996
INVENTOR(S) : Jean-Pierre Talvard, Henri Seydoux It is certified that error appears in the above-indentified patent and that said Letters Patent is hereby corrected as shown below:

In column 12, line 7, replace "restarred" with --restarted--.

Signed and Sealed this

Eighth Day of July, 1997

*Attest:*

BRUCE LEHMAN

*Attesting Officer*   *Commissioner of Patents and Trademarks*